United States Patent [19]

DePuy et al.

[11] 4,219,858
[45] Aug. 26, 1980

[54] OVERCURRENT RELAY APPARATUS

[75] Inventors: Robert P. DePuy, Cherry Hill, N.J.; Arthur H. Leitten, Jr., Syracuse, N.Y.

[73] Assignee: General Electric Company, Schenectady, N.Y.

[21] Appl. No.: 971,312

[22] Filed: Dec. 20, 1978

[51] Int. Cl.² .............................................. H02H 3/08
[52] U.S. Cl. ...................................... 361/93; 361/96; 364/483
[58] Field of Search .................................. 361/93–98, 361/79–81; 364/483

[56] References Cited

U.S. PATENT DOCUMENTS

| | | | |
|---|---|---|---|
| 3,569,785 | 3/1971 | Durbeck | 361/80 |
| 3,731,152 | 5/1973 | Rockefeller, Jr. | 361/80 |
| 4,017,766 | 4/1977 | Vercellotti et al. | 361/96 X |
| 4,077,061 | 2/1978 | Johnston et al. | 364/483 |
| 4,107,778 | 8/1978 | Nii et al. | 361/80 X |

Primary Examiner—Harry E. Moose, Jr.
Attorney, Agent, or Firm—Julius J. Zaskalicky; James C. Davis, Jr.; Marvin Snyder

[57] ABSTRACT

Digital overcurrent relay apparatus utilizing sampling, digital conversion and digital comparison techniques is described. The apparatus provides a trip signal after an alternating current in a line being monitored by the apparatus exceeds a preset pick up value for a period of time which is an inverse function of the magnitude of the current expressed in multiples of pick up value.

9 Claims, 15 Drawing Figures

OVERCURRENT RELAY APPARATUS

The present invention relates to overcurrent relay apparatus.

This application is related to patent application Ser. No. (RE-11,293), filed concurrently herewith and assigned to the assignee of the present application.

Various electromechanical devices are currently utilized to sense overcurrents in a-c power lines and provide trip signals to interrupt the current in the power lines after a predetermined duration of the overcurrent. Such devices are referred to as time overcurrent relays. One such device comprises an induction disk supported on a shaft carrying a contact. The periphery portion of the disk is adapted to move within a laminated U magnet on which is situated a coil to which operating current proportional to the current in the power line is applied. The shaft is restrained in movement by a spring which sets or determines the value of current, referred to as pick up value, in the coil at which the disk starts to move. A stationary contact is situated displaced from the movable contact. The time it takes for the disk to rotate and complete the contact is a function of the current flowing in the coil. When the movable contact engages the stationary contact a trip circuit is completed and a trip signal is provided.

When the current in the coil is below pickup value the spring restrains the movement of the disk and the disk remains stationary. When the current in the operating coil rises above pick up value and causes the disk to move but falls below pick up value before the disk has moved sufficiently to engage the stationary contact and complete the trip circuit, the spring returns the disk to its starting position. When the current flowing in the operating coil rises above pick up value and remains above pick up value, the disk moves and after a predetermined interval of time the movable contact engages the stationary contact and completes the trip circuit. The interval between the time current rises above pick up value and the time the trip circuit is completed is a function of the current flowing in the operating coil. Thus, the time of operation of the relay versus current as measured in terms of multiples of pick up value may be represented by a graph in which time of pick up varies in an inverse relationship with respect to current.

The present invention is directed to the provision of entirely electronic means for performing the functions performed by electromechanical time overcurrent relays.

Another object of the present invention is to provide time overcurrent relay apparatus of reduced size, improved performance and increased flexibility.

In accordance with an illustrative embodiment of the present invention, an electronic system is described for providing a plurality of output signals, each in response to a respective one of a plurality of simultaneously occurring alternating input signals of a first frequency, each exceeding a respective preset pick up level. The time of occurrence of each of the output signals in relation to the time at which a respective input signal exceeds the respective pick up level varies in an inverse relationship to a mean value of the respective input signal. Means are provided periodically sampling the plurality of input signals in sequence at a second frequency greater than the first frequency to provide a first sequence of samples of said input signals. The first sequence is constituted of successive sets of samples, corresponding numbered samples of successive sets forming a subsequence. Each subsequence includes samples of a respective input signal, and each subsequence has a period equal to the period of the first sequence of samples multiplied by the number of input signals. Means are provided for converting the absolute value of each of the samples of the first sequence into a respective binary number to provide a first sequence of binary numbers. Means are provided for converting each of the binary numbers of the first sequence into a respective derived binary number to provide a second sequence of binary numbers. The second sequence of binary numbers is constituted of successive sets, corresponding numbers of successive sets forming a plurality of subsequences, the period of occurrence of the numbers of each of said subsequences equaling the period of the first sequence of samples multiplied by the number of input signals. Summation means are provided for successively summing the binary numbers of each of the subsequences of the second sequence to provide a third sequence of binary numbers. The third sequence of binary numbers is constituting successive sets of numbers, corresponding numbers of successive sets forming a plurality of subsequences, the period of occurrence of the numbers of each of the subsequences equaling the period of the first sequence of samples multiplied by the number of input signals. Counter means are provided including a plurality of counters each of which is continuously clocked at a third frequency, each of the counters providing a respective output at the end of a predetermined count which occurs over a period of time in excess of one-half cycle of the input signals. Means are provided responsive to the output from each of the counters for resetting a respective number of the third sequence of numbers in the summation means. Means are provided responsive to a binary number corresponding to a sample of one of said signals in excess of the pick up level to reset a respective counter whereby when the aforementioned one of the input signals exceeds the pick up level and remains above said pick up level, the respective counter is reset periodically within a count less than the predetermined count, and when the aforementioned one of the input signal drops below the pick up level for a period of time corresponding to the predetermined count, an output is obtained which resets the respective number of the third sequence in the summation means. Means are provided for storing a plurality of binary numbers each representing respective one of a plurality of limit numbers. Comparator means are provided for continuously comparing each subsequent of binary numbers of the third sequence in the summation means with a respective one of the limit numbers and for providing an output signal when a binary number of the subsequence exceeds a respective limit number.

The novel features which are believed to be characteristic of the present invention are set forth with particularity in the appended claims. The invention itself, both as to its organization and method of operation, together with further objects and advantages thereof, may best be understood by reference to the following description taken in connection with the accompanying drawings wherein:

Figure 1:
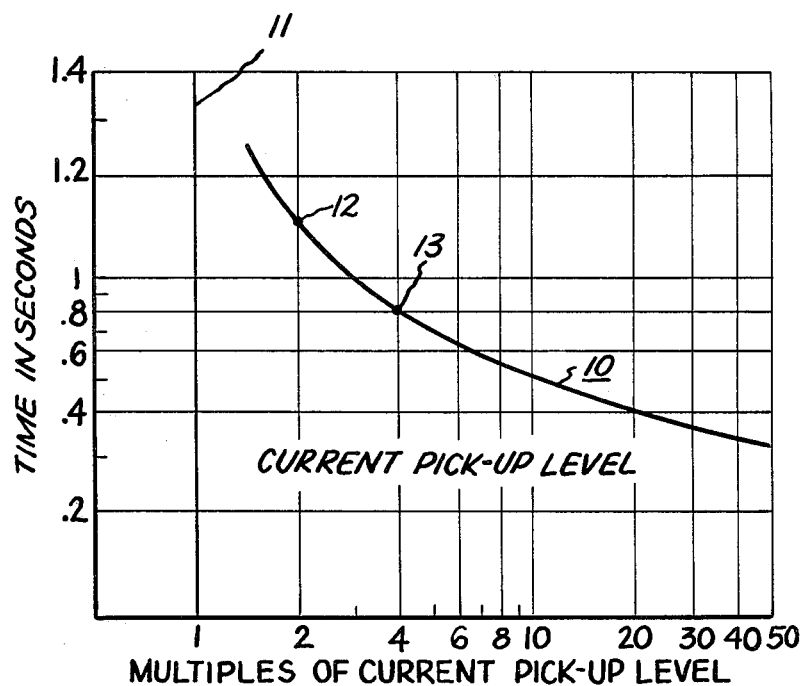
FIG. 1 is a graph of a time versus current characteristic of a time overcurrent relay expressed in terms of multiples of current pick up level and useful in explaining the principles of the present invention.

Reference is now made to FIG. 1 which shows a graph 10 of a time overcurrent characteristic of an electromechanical time overcurrent relay, such as described above, and of the kind which is functionally emulated in apparatus of the present invention. Time in seconds on a logarithmic scale is plotted along the ordinate and root mean square current expressed in terms of multiples of pick up current also on a logarithmic scale is plotted along the abscissa. The ordinate 11 represents pick up level. Consider a point 12 on the graph 10 corresponding to a value of current equal to twice pick up level. At this value of pick up current it would take 1.15 seconds for the relay to trip. For 60-cycles per second current the relay would trip after 69 cycles. Consider another point 13 on the graph 10 corresponding to a value of current equal to four times pick up level. At this value of current it would take the relay about 0.8 second, or 48 cycles, to trip.

In each of the above cases, if the current were to be sampled every four degrees or ninety times per cycle, the sum of the current samples for the total number of cycles could be represented by the following equation:

$$\sum_{i=1}^{N} G(I_i) = L. \quad (1)$$

where $I_i$ represents the $i^{th}$ current sample, N represents the total number of samples before completion of the trip circuit and L represents a number equal to the sum of the N samples. For the first case, i.e. point 12 on the graph 10, N is 6210 and L is a number equal to the sum of the 6210 samples. For the second case, i.e. point 13 on the graph 10, N is 4320 and L is another number equal to the sum of the 4320 samples. The sums of the samples represented by L is different for the two cases and would also be different for other points on the graph 10.

The implementation of a time overcurrent characteristic such as shown in FIG. 1 by digital means would be simplified if the sum of the current samples for all points on the graph 10 were equal to the same limit number within an acceptable margin of error. To meet this requirement a transfer function $G(I_i)$ is provided in accordance with the present invention such that the sum of the values of transfer function for the current samples for all points on a particular graph 10 may be represented by the following equation:

$$\sum_{i=1}^{N} G(I_i) = L_l. \quad (2)$$

where $G(I_i)$ is an empirical function of the amplitude of the current samples $I_i$, $I_l$ is a constant for a particular graph, N represents the total number of samples occurring within the time represented by the ordinate of a point on the graph and also represents the time it takes to reach the limit number $L_l$. By comparing the sum of the values of transfer function $G(I_i)$ for the samples with the limit number $L_l$ and providing a trip signal when the limit number is exceeded, the desired result is achieved. The manner in which the transfer function $G(I_i)$ for a particular graph can be derived empirically will be described below in connection with FIG. 2.

Figure 2:
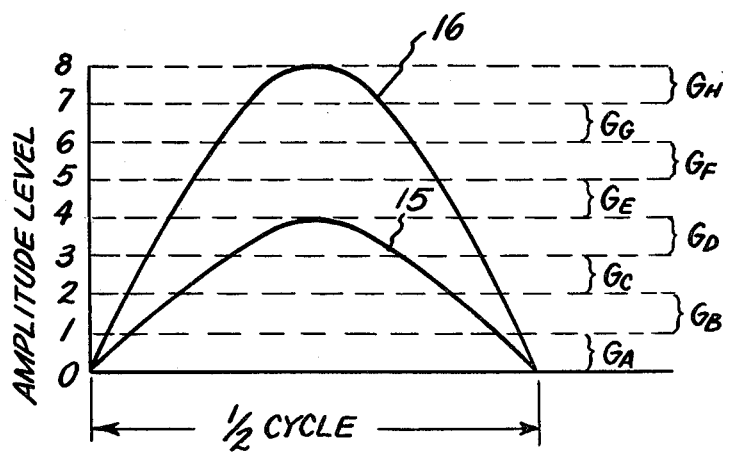
FIG. 2 is a diagram useful in explaining the manner in which electronic means may be utilized to implement characteristic curves such as the characteristic curve shown in FIG. 1.

Reference is now made to FIG. 2 which shows a graph 15 of one-half of a cycle of an input or current signal of twice pick up level and another graph 16 of one-half of a cycle of an input signal of four times pick up level which will be used to describe the manner in which values of the transfer function $G(I_i)$ are arrived at for the current samples $I_i$. Amplitude levels of 1 through 8 are set forth along the ordinate. The various bands of amplitude between successive amplitude levels are assigned the specific values $G_A$ through $G_H$, respectively, of the transfer function $G(I_i)$, and are shown to the right of the graphs. Signals having an amplitude between level 0 and level 1 have a transfer function value of $G_A$. Signal samples having an amplitude falling within the band between level 1 and level 2 have a transfer function value of $G_B$ and so on through to $G_H$. Consider now point 12 on the graph of FIG. 1 corresponding to a current of twice pick up value. From FIG. 2 the amplitude of the current of twice pick up value (graph 15) cycles between level 0 to level 4 requiring the utilization of the four transfer function values $G_A$ through $G_D$. Utilizing equation 2, the transfer function values of the samples are summed through 69 cycles occurring during the 1.15 seconds required by the time period set forth on the graph of FIG. 1 and a limit number $L_l$ is obtained. Now consider point 13 corresponding to a current of four times pick up value. For this value of current the time period set forth on graph 10 is 0.8 second corresponding to 48 cycles. Considering again equation 2, the summation of the transfer function values for the samples for this value of current must equal the constant $L_l$ derived from the previous case. The specific values for the transfer function for the levels between level 0 and level 4, namely $G_A$-$G_D$, were fixed in arriving at the value $L_l$, the constant for the characteristic curve or graph 10. The specific values for the transfer function for levels 4 through 8 have not been fixed. These specific values for the transfer function are empirically assigned so that the sum of the transfer function values of samples equals the constant $L_l$ derived for the point 12 representing twice pick up level. Values for the transfer function for currents of higher multiples of pick up value are similarly arrived at. As all amplitude values of a sine wave occur in one-half of a cycle, what has been described for a half wave is valid for any number of half waves.

The manner in which equation 2 along with a table of specific values (not shown) for the transfer function $G(I_i)$ for the bands of amplitude level is utilized in time overcurrent apparatus in accordance with the present invention will now be described. Assume that an input signal corresponding to current in a power line is above pick up level and corresponds to the abscissa of a point on characteristic curve 10. The signal is sampled at a relatively high rate in relation to its frequency. The sampled values are converted to binary numbers preferably on a logarithmic basis using an analog-to-digital converter. Values of the transfer function $G(I_i)$ for the bands of levels are empirically determined as explained above, and stored in a ROM (Read Only Memory). Each of the binary values of the samples obtained from the analog-to-digital converter accesses the ROM which provides at its output a respective number representing the specific value of the transfer function. The transfer function numbers are added successively and the accumulated sum is stored in an accumulator. The limit number, corresponding to $L_l$ of equation 2, is fixed for a particular time versus current characteristic curve and may be determined by performing the summation of equation 2 for a point on the characteristic curve. The limit number $L_l$ is stored in a limit number register. After the accumulator has been incremented by a transfer function number, the number stored in the accumulator is compared in a comparator on a bit-by-bit basis with the limit number $L_l$ starting with the least significant bit. When the number in the accumulator exceeds the number in the limit number register, an output is obtained from the comparator. The time of occurrence of this output represents the ordinate of the point on the graph 10 corresponding to the input signal. The output of the comparator then may be utilized to actuate a trip circuit to interrupt current in the power line being monitored. Counter means are provided responsive to current amplitudes less than pick up level to provide an output which continuously resets the accumulator to avoid accumulation of a sum in the accumulator for values of current less than pick up. Means are provided for disabling the counter means when current exceeds pick up level enabling summation to occur.

Figure 4:
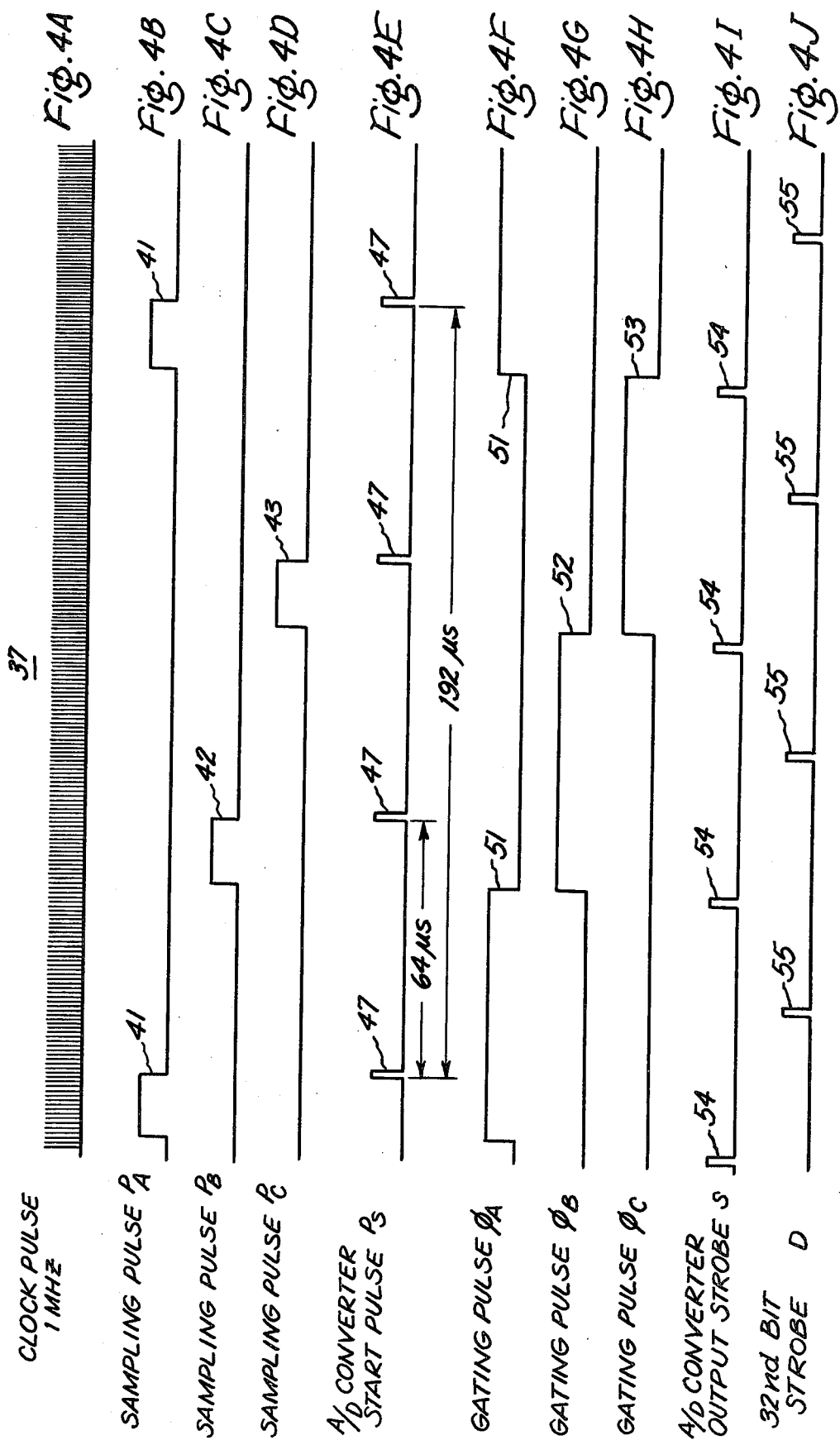
FIGS. 4A-4J are diagrams of voltage waveforms utilized in the apparatus of FIG. 3 and useful in explaining the operation thereof.
Figure 5:
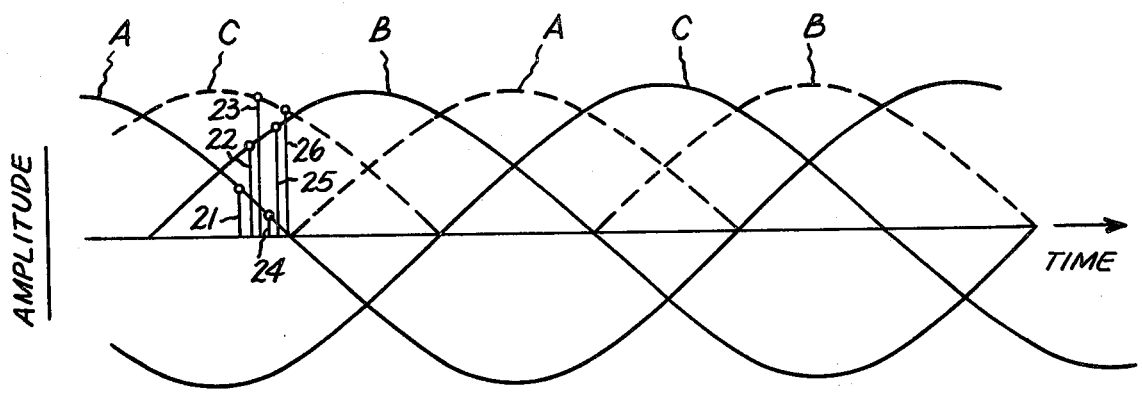
FIG. 5 is a diagram of three phase voltages representing currents in a three phase power line useful in explaining one aspect of the operation of the apparatus of FIG. 3.

The manner in which the principles described in connection with FIGS. 1 and 2 are implemented will now be described in connection with FIGS. 3 and 4. A source 30 of a-c signal corresponding to current in a power line is shown. The source 30 may be a current transformer connected to the power line and conveniently it is shown as a three phase source having a frequency of 60 hertz. The three phase signals are applied to a three-phase rectifier 32 which includes resistive elements to provide three-phase voltages proportional to the rectified currents. The constant of proportionality for each of the three phases is variable to provide flexibility in operation of the apparatus, as will be explained below. For example, it may be desired to set different pick up levels for each of the three phases while still using the same limit number for each of the three phases. Variability of the constants of proportionality are indicated by variable resistive elements 32A, 32B and 32C associated with phases A, B and C of the output of rectifier 32. The three-phase voltage signals are shown in solid lines in FIG. 5 and are designated A, B and C. The rectified portions of these three-phase signals are shown in dotted lines. The three-phase signals are continuously sampled in sequence at a frequency greater than the frequency of the three-phase signals to provide a sequence of samples thereof, only samples 21-26 of which are shown. The sequence can be divided into successive sets of samples with samples 21, 22 and 23 constituting one set, and samples 24, 25 and 26 constituting a succeeding set. Corresponding samples of successive sets form a subsequence. Thus, samples 21 and 24 form a part of subsequence of the A-phase input signal, samples 22 and 25 form a part of a subsequence of the B-phase input signal, and samples 23 and 26 form a part of a subsequence of the C-phase input signal. Each of the three subsequences has a period equal to the period of the sequence of samples multiplied by three, the number of input signals. Conveniently the three input signals are sampled approximately once every four degrees of a cycle, i.e. approximately 90 times per cycle. The period between successive samples in a sequence is 64 microseconds and the period between successive samples in a subsequence is 192 microseconds.

Figure 3:
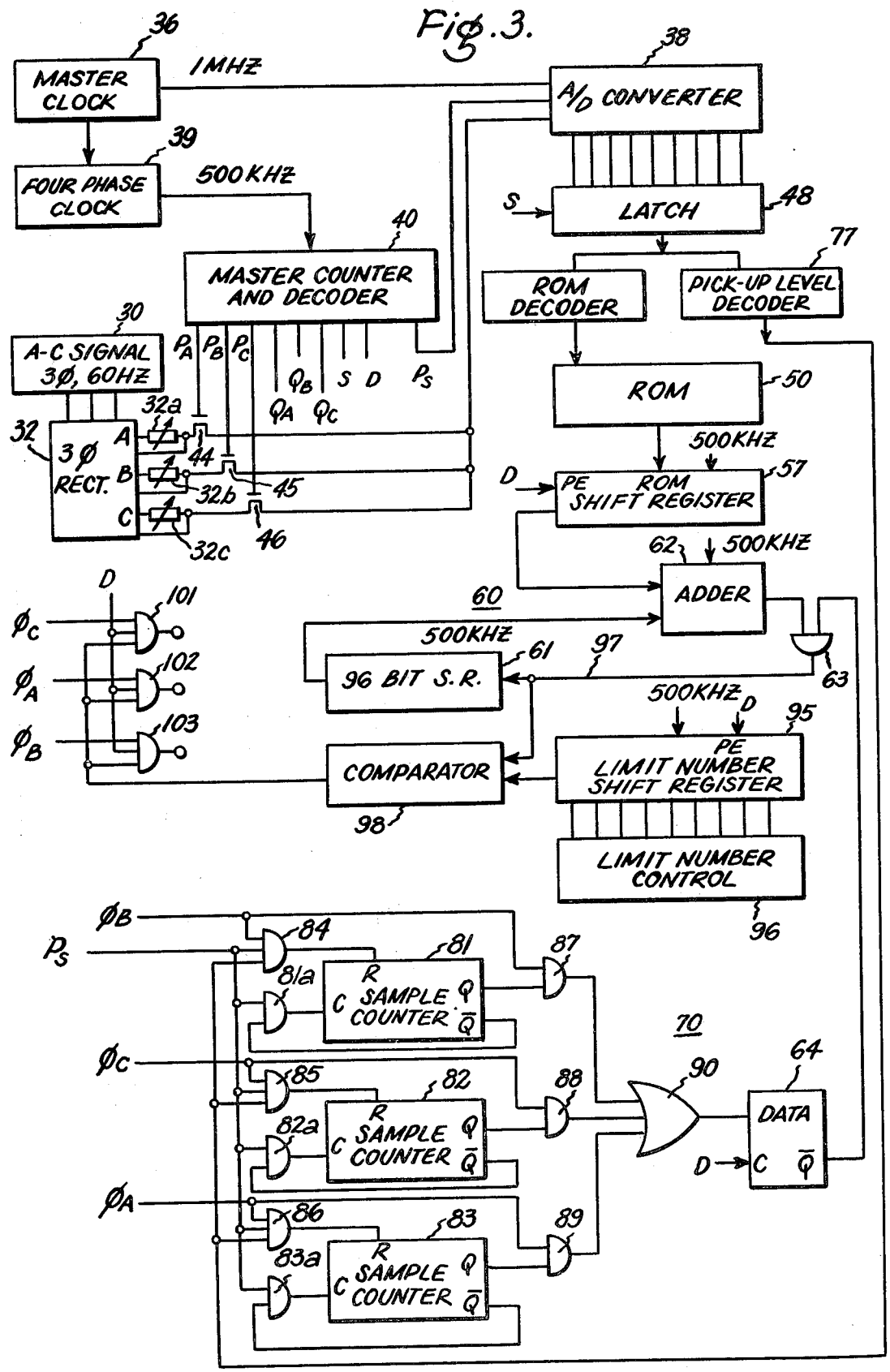
FIG. 3 is a block diagram of an embodiment in accordance with the present invention.

Master clock 36 provides the basic timing for the apparatus of FIG. 3. Conveniently the frequency of the clock 36 is set at 1 megahertz and provides clock pulses 37 at this frequency, as shown in FIG. 4A. The clock pulses 37 are utilized in the operation of analog-to-digital converter 38. Preferably converter 38 is a logarithmic analog-to-digital converter to provide large dynamic range. One such converter is described and claimed in patent application Ser. No. (RD-11,289), filed concurrently herewith and assigned to the assignee of the present invention. The clock pulses 37 are also applied to four phase clock 39 which provides four trains of clocking pulses each having a frequency of 500 kilohertz with each successive pulse train displaced in phase by a quarter of a cycle from the preceding train. The four phase clock 39 is utilized to drive a master counter and decoder 40 which provides the timing waveforms shown in FIGS. 4B through 4J for operation of the apparatus, as will be explained below. FIG. 4B shows the sampling pulses 41, designated waveform $P_A$, for sampling the phase A input signal. Each pulse 41 has a duration of about 16 microseconds and has a period of 192 microseconds, i.e. it occurs about once every four degrees, as explained above. FIG. 4C and 4D show the sampling pulses 42 and 43, designated waveforms $P_B$ and $P_C$, utilized for sampling the phase B and phase C input signals, respectively. Pulses are 41, 42 and 43 applied to the gates of transistor switches 44, 45 and 46, respectively, to produce the sequence of samples which are applied to the analog-to-digital converter 38 for conversion into binary numbers. FIG. 4E shows the start pulses 47, designated as waveform $P_S$, utilized for initiating operation of the analog-to-digital converter for converting amplitude samples into binary numbers. The period of the start pulses 47 is 64 microseconds. FIGS. 4F, 4G and 4H show gating pulses 51, 52 and 53, designated as waveforms $\phi_A$, $\phi_B$ and $\phi_C$, respectively, utilized for multiplexing and demultiplexing of sample data associated with the three phase input signals in various portions of the apparatus as shown FIG. 3 and as will be explained below. FIG. 4I shows strobe pulses 54, designated waveform S, which has a 64 microsecond period. A strobe pulse 54 occurs after the analog-to-digital converter 38 has converted an analog sample into a binary number and functions to release a latch 38 connected thereto to apply the number to a ROM (read only memory) decoder 49 for accessing the ROM (read only memory) 50 which stores values of the transfer function $G(I_i)$ corresponding to values of current samples, as explained in connection with FIG. 2. FIG. 4J shows strobe pulses 55, designated as waveform D which has a 64 microsecond period. A strobe pulse 55 performs an indexing function in connection with the processing of the data of the three phase input signals, as will be explained below.

As mentioned above, samples are taken of the phase A, phase B and phase C signals to provide three subsequences of samples which are multiplexed into a resulting sequence of samples and supplied to the analog-to-digital converter 38 which converts the samples into binary numbers representing the amplitude of the analog samples. Successive samples in a subsequence of samples occur every 192 microseconds. Successive samples in the sequence of samples occur every 64 microseconds. The time period from the leading edge of a phase A sampling pulse 41 to the leading edge of next succeeding phase B sampling phase 42 is referred to as a phase A time period. The time period from the leading edge of a phase B sampling pulse 42 to the leading edge of the next succeeding phase C sampling pulse 43 is referred to as the phase B time period. The time period from the leading edge of a phase C sampling pulse 43 to the leading edge of the next succeeding phase A sampling pulse 41 is referred to as the phase C time period. A binary number corresponding to a sample of a phase is available at the output of the analog-to-digital converter and on the latch 48 during the latter part of the period for that phase. A binary number corresponding to a phase A sample is available during the latter part of a phase A period, a binary number corresponding to a phase B sample is available during the latter part of a phase B period, and a binary number corresponding to a phase C sample number is available during the latter part of a phase C period. The strobe pulse 54, waveform S of FIG. 4I, accesses latch 48 during each of the phase periods after the binary number corresponding to the sample is available on the latch and supplies the number to a ROM decoder 49. The ROM decoder 49 accesses a memory location in the Read Only Memory 50 which stores the specific values of the transfer function $G(I_i)$ for bands of amplitude values, as described above in connection with FIG. 2. The specific transfer function numbers for the samples as they are obtained are shifted in sequence, one binary number at a time, into shift register 57. Thus, in response to the three-phase sampling of the rectified three-phase signals, the signal samples obtained are converted into numbers which in turn are converted into transfer function numbers which are then shifted in sequence into the ROM shift register 57, preparatory to performance of the summation operation set forth in equation 2. The summation operation of equation 2 is performed by a summation means 60 comprising a 96 bit shift register 61 and an adder 62. The output of the ROM shift register 57 is applied to one input terminal of the adder 62, least significant bit first. The output of the 96 bit shift register 61 is applied to another input terminal of the adder 62 least significant bit first. The output of the adder is applied to the input of AND gate 63, the output of which is connected to the input of 96 bit shift register 61. The other input of the AND gate 63 is connected to the output terminal of a clocked latch 64 which provides, in the absence of input thereto, a high level output enabling transmission of the output of the adder 62 to input of shift register 61. When a reset signal from summation reset circuit 70 is applied to an input of the latch 64, the output thereof changes to a low level and causes AND gate 63 to provide zeros at its output.

The change to low level is initiated by 32 bit strobe pulse 55, waveform D of FIG. 4J and persists for a duration of 32 bits. Clocked latch 64 is shown as a D-type flip-flop with output taken from the $\bar{Q}$ terminal, 32 bit strobe pulses 55 applied to the clock terminal C, and the output of the summation circuit 70 connected to D input terminal. The ROM shift register 57, the adder 62 and the serial shift register 61 are all clocked at a 500 kilohertz rate with 96 bits provided in the serial shift register 61 to provide the storage of sums for the three subsequences of numbers, as described above, 32 bits being allocated for each of the three subsequences of numbers. The three blocks of 32 bits allotted for accumulation of the sums of the binary values of each subsequence of samples are indexed or synchronized by the 32nd bit strobe pulses 55, waveform D of FIG. 4J. Pulses 55 are applied to the preset enable terminal of the ROM shift register 57 to initiate clocking out of the bits representing the binary numbers stored in this shift register into the adder 62 at the proper time. While the strobe pulse 54 for a phase A period occurs in the latter portion of the phase A period, the transfer function value corresponding to such a sample does not appear in the shift register 57 until a later time and is not available for processing in the summation means 60 until the occurrence of the phase B period. Thus, the strobe pulse 55 for initiating transfer of the number corresponding to a phase A sample into adder 62 does not occur until the phase B interval. The 32nd bit strobe pulse 55 occurring during the phase B interval is the 32nd bit of the block of bits allotted for accumulation of the sums of the phase C samples. The 32nd bit of the block of 32 bits for accumulation of the phase A samples would be represented by the next strobe pulse 55 occurring in the phase B period. The following strobe pulse 55 would represent the 32nd bit of the phase B block of 32 bits. Thus, the occurrence of the 32nd bit strobe pulses 55 access in sequence the transfer function numbers of the three phase signal samples sequentially applied to the shift register 57 and times the addition thereof in sequence to the numbers stored in the three blocks of 32 bits. Prior to the summation operation the summation means 60 is reset by summation reset circuit 70 which provides a reset signal periodically to reset the summation means 60 if the signals in each of the three phase circuits is less than pick up value. The period of this reset signal may be set to any value and conveniently it is set at a value greater than the period of the input signals but less than twice this period, as will be described below. If the input signals are greater than pick up value, no reset occurs and the transfer function numbers corresponding to the samples developed are summed in the summation means, as explained above.

Figure 6:
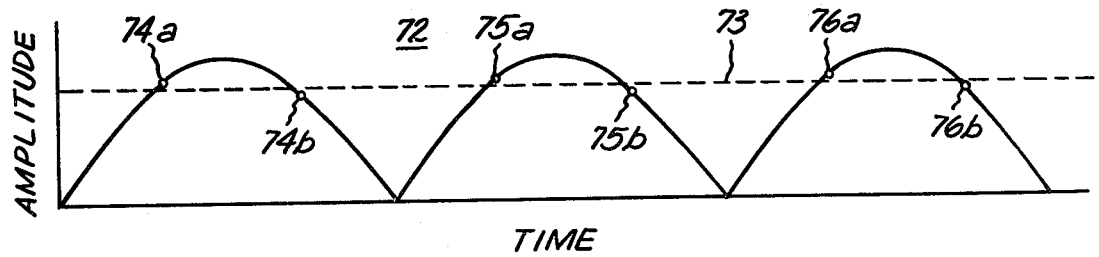
FIG. 6 is a diagram useful in explaining another aspect of the operation of the apparatus of FIG. 3.

Before describing the manner in which the reset signal is developed by summation reset circuit 70, the conditions under which reset is desired will be described. If each of the three input signals is less than pick up value, reset of the summation means 60 is desired. If one of the input signals rises above the pick up value for a time and thereafter falls below pick up value before a limit sum is reached, reset is also desired. If one of the input signals rises above pick up value and remains above pick up value, reset is not desired. In accordance with one aspect of the present invention, a sample counter, one for each of the three input signals, is utilized in conjunction with logic to perform these functions. The sample counter is configured to provide an output when the number of pulses corresponding to samples applied to it is equal to some predetermined value greater than the number of samples in a cycle. For example, with about 90 samples in a cycle it is convenient to use a 128 bit counter, i.e. a counter which provides an output after 128 pulses are applied to the input thereof. Such a counter operating continuously would provide an output which would be able to continuously reset the summation means 60. Providing such a counter with a reset signal responsive to the occurrence of a sample above pick up value would inhibit an output therefrom provided that the signal remained above pick up. Were the signal to fall below pick up and remain there for the time represented by the predetermined count, a reset signal would be developed and would reset the summation means 60. These principles are illustrated in FIG. 6 which shows three half cycles of an input signal having an amplitude which exceeds pick up level 73. The sample 74a occurs when the input signal exceeds the pick up level 73 and a reset signal is applied to the reset terminal of the sample counter. A reset occurs in the sample counter for each sample exceeding the pick up level 73 and does not cease until sample 74b occurring below pick up level 73. During the next half-cycle the signal again exceeds the pick up value and assuming that the two half-waves are symmetrical this would occur at sample 75a, 45 samples later than sample 74a, but less than 45 samples from sample 74b. During the third half-cycle the signal again exceeds the pick up level 73 at the sample 76a, 90 samples later than sample 74a, but less than 90 samples from sample 74b. Thus, the sample counter is reset at less than every 45th sample and this would continue as long as the signal exceeded the pick up level 73. Were the signal to fall below the pick up level 73 and remain there over the number of samples represented by the predetermined count of the sample counter, an output signal would be produced which would reset the summation means 60 as described above. Thus, a sample counter functioning as described would fulfill the three conditions described above.

Logic is utilized to determine when a sample exceeds a predetermined pick up level 73. To this end the pick up level decoder 77 is provided. Bit lines from the latch 48 are connected to the level decoder 77 which develops an output whenever the value of a sample exceeds the pick up value 73. This output is applied to input of summation reset circuit 70 over line 78. In the embodiment of FIG. 3 as three input signals are involved three sample counters 81, 82 and 83 are provided, one for each of phases A, B and C, respectively. Conveniently, the sample counters are provided with a predetermined count of 128 as this represents the next highest number of bits above 90, the number of samples in a cycle of the input signals, as mentioned above. Each of the counters includes a clock or pulse input terminal C, an output terminal Q, an inverted output terminal $\bar{Q}$ and a reset terminal R. AND gates 81a, 81b and 81c are provided for counters 81, 82 and 83, respectively. The start pulses 47, waveform $P_S$ of FIG. 4E, are utilized as the clocking pulses and are applied to one input of each of the AND gates 81a, 82a and 83a. The output of each of AND gates 81a, 82a and 83a is connected to the clocking terminal C of a respective one of counters 81, 82 and 83. The other input of each of the AND gates 81a, 82a and 83a is connected to the $\bar{Q}$ terminal of a respective one of counters 81, 82 and 83. Thus, after the occurrence of 128 samples, each of the sample counter provides an output unless it has been reset by a signal applied to the reset terminal R thereof. As the level decode signals from pick up level decoder 77 for functioning the resets of each of the sample counters are multiplexed, each of the level decode signals is demultiplexed before it is applied to its respective counter. Also, the outputs of each of the sample counters 81, 82 and 83 are multiplexed and then combined in an OR gate 90 before they are applied to latch 64, the output of which is applied to AND gate 63. The de-multiplexing function is performed by AND gates 84, 85 and 86 for phases A, B and C, respectively. The waveforms of $\phi_B$, $\phi_C$ and $\phi_A$ are applied to a first input of AND gates 84, 85 and 86, respectively. The start pulse waveform $P_S$ is applied to a second input of each of AND gates 84, 85 and 86. The line 78 from pick up level decoder 78 is applied to a third input of each of AND gates 84, 85 and 86. The output of each of AND gates 84, 85 and 86 is connected to the reset terminal R of a respective one of sample counters 81, 82 and 83. The multiplexing of the outputs of the sample counters 81, 82 and 83 is provided by the AND gates 87, 88 and 89 for phases A, B and C, respectively. The waveforms $\phi_B$, $\phi_C$ and $\phi_A$ are applied to a first input of AND gates 87, 88 and 89, respectively. The Q outputs of each of sample counters 81, 82 and 83 is applied to a second input of a respective one of AND gates 87, 88 and 89. The outputs of each of the AND gates 87, 88 and 89 is applied to a respective input terminal of OR gate 90, the output of which is applied to input terminal D of latch 64. Waveform D is applied to the clock terminal C of latch 64. Thus, whenever any one of the three-phase input signals has been below pick up value for 128 samples or has risen above pick up value and drops below pick up value and remains below pick up for 128 samples, an output is obtained from the sample counter associated with the phase of that input signal. This output activates latch 64 to provide an output which erases the sum accumulated in the block of 32 bits circulating in the summation means associated with the phase of that input signal. Whenever any one of the input signals rises above pick up level and remains above pick up level, the sample counter associated with the phase of that signal is reset before the full count of 128 samples has been reached and no output appears to reset the summation means for that phase. Thus, summation continues to occur for that phase until the limit number is reached, as will be explained in more detail below.

Conveniently, the number appearing at the output of the analog-to-digital converter 38 is an eight bit binary number. This number accesses a transfer function number in the ROM 50 which may include a larger number of bits. For each of the phases the sum of the transfer function numbers can total to a binary number representable by 32 bits. The limit number of equation 2 representing a particular graph such as graph 10 of FIG. 1 is expressed by a nine bit number which is written into limit number shift register 95 by limit number control 96. The numbers summed or accumulated in the 96 bit shift register 61 are compared in the comparator 98 with the number stored in the shift register 95 on a bit-by-bit basis, least significant bit first. To this end the input to the shift register 61 is applied to one input terminal of the comparator 98. The other input terminal of the comparator 98 is connected to the output terminal of the limit number shift register 95. The shift register 95 is clocked at a 500 kilohertz rate, the same as utilized for the 96 bit shift register. The limit number shift register 95 is enabled by the 32nd bit strobe pulse 46, waveform D. The enable function of shift register 95 is provided with delay so that the least significant bit of the limit number in shift register 95 is compared with the 23rd bit of a sum number in the block of 32 bits circulating in shift register 61. The next least significant bit of the limit number is compared with the 24th bit of the sum number and so on. If a bit in the sum number is greater than a bit in the limit number, a change in level in one direction occurs at the output of the comparator 98 and if the next bit in the sum number is smaller than the next bit in the limit number, a change in level in the opposite direction occurs at the output of the comparator. After the sum number and limit number have been compared on a bit-by-bit basis, if the sum number is larger than the limit number, a change in level in the one direction appears at the output of the comparator 98. This output of the comparator 98 is utilized to provide an output signal for completion of a tripping circuit for tripping the phase of the power lines producing that signal. As the numbers being compared are multiplexed, levels appearing at the output of the comparator are multiplexed. Accordingly, to provide the appropriate indications for each phase it is necessary to demultiplex the outputs. Demultiplexing of the outputs of the comparator 98 is provided by the AND gates 101, 102 and 103 for phases A, B and C, respectively. Waveforms $\phi_C$, $\phi_A$ and $\phi_B$ are applied to a first input of AND gates 101, 102 and 103, respectively. Waveform D is applied to a second input of each of the AND gates 101, 102 and 103. The output of the comparator 98 is applied to a third input of each of the AND gates 101, 102 and 103. Phase C period pulses, waveform $\phi_C$ are utilized at the input of gate 101 for phase A as phase A samples occur successively later as a result of processing phase A information so that by the time the sum number associated with phase A is compared with a limit number, the output appears during a phase C period. The 32nd bit strobe pulse 55, waveform D, is also applied to each of the AND gates as comparison of a sum number is not complete until the 32nd bit of a block of 32 bits has been reached. Thus, a high level appearing at the output of comparator 98 for a phase A sum number indicating that the phase A sum number is larger than the limit number would produce a change from low level to high level at the output of AND gate. This output constitutes the trip signal for phase A line. Waveforms $\phi_A$ and $\phi_B$ are utilized at the inputs of AND gates 102 and 103, respectively, for the reason similar to the reason mentioned above for AND gate 101. Also, phase B and phase C trip signals are similarly obtained at the output of the AND gates 102 and 103.

While the sample counters 81, 82 and 83 were set to provide an output after a count of 128 samples corresponding to a time period greater than one cycle but less than two cycles of the input signals, counters providing an output for a smaller number of samples could be advantageously used. Sample counters providing an output after a count of a number of samples corresponding to a time period of about one-half of a cycle of the input signals could be advantageously used.

While the apparatus of FIG. 3 has been described for a situation wherein the pick up level 11 of FIG. 1 for each of the three phases is the same, the relative pick up levels of the three phases can be changed by changing the relative magnitudes of the input signals by use of controls 32a, 32b and 32c, associated with three phase rectifier 32.

While the same limit number was used for each of the three phases, limit number control 96 may be programmed to provide different limit numbers to shift register 95 thereby setting different limits for each of the phases.

In connection with FIGS. 1 and 2, a limit number $L_1$ was utilized to define graph 10 and specific values for the transfer function $G(I_i)$ were developed for use in connection with graph 10. Providing a larger limit number, i.e. the number stored in limit number shift register 95, and utilizing the same specific values of the transfer function stored in the ROM 50 would have the effect of shifting graph 10 upward in the ordinate direction. Similarly, providing a smaller limit number would have the effect of shifting graph 10 downward in the ordinate direction. Thus, a family of graphs similar to graph 10 can be provided simply by changing the limit numbers.

Also, while the apparatus of FIG. 3 has been described in connection with specific values of the transfer function $G(I_i)$ stored in the ROM 50 corresponding to a time versus current graph such as shown in FIG. 1, it will be understood that other graphs having other inverse forms may be provided and corresponding transfer function values developed therefor.

While the apparatus of FIG. 3 has been described in connection with monitoring a three phase system, it is apparent that the apparatus could be used to monitor two phases and ground of a system as well.

While the invention has been described in a specific embodiment, it will be appreciated that modifications, such as those described above, may be made by those skilled in the art and it is intended by the appended claims to cover all such modifications and changes as fall within the true spirit and scope of the invention.

What is claimed is:

1. A system for providing a plurality of output signals, each in response to a respective one of a plurality of simultaneously occurring alternating input signals of a first frequency, each exceeding a respective preset pick up level, the time of occurrence of each of said output signals in relation to the time at which a respective input signal exceeds said respective pick up level varying in an inverse relationship to a mean value of said respective input signal comprising means for periodically sampling said plurality of input signals in sequence at a second frequency greater than said first frequency to provide a first sequence of samples of said input signals, said first sequence constituted of successive sets of samples, corresponding numbered samples of successive sets forming a subsequence, each subsequence including samples of a respective input signal, each subsequence having a period equal to the period of said first sequence of samples multiplied by the number of said input signals, means for converting the absolute value of each of said samples of said first sequence into a respective binary number to provide a first sequence of binary numbers, means for converting each of said binary numbers of said first sequence into a respective derived binary number to provide a second sequence of binary numbers, said second sequence of binary numbers constituted of successive sets, corresponding numbers of successive sets forming a plurality of subsequences, the period of occurrence of the numbers of each of said subsequences equaling the period of said first sequence of samples multiplied by the number of said input signals, summation means for successively summing the binary numbers of each of said subsequences of said second sequence to provide a third sequence of binary numbers, said third sequence of binary numbers constituting successive sets of numbers, corresponding numbers of successive sets forming a plurality of subsequences, the period of occurrence of the numbers of each of said subsequences equaling the period of said first sequence of samples multiplied by the number of said input signals, counter means including a plurality of counters each of which is continuously clocked at a third frequency, each of said counters providing a respective output at the end of a predetermined count, said predetermined count occurring over a period of time in excess of one-half cycle of said input signals, means responsive to the output from each of said counters for resetting a respective number of said third sequence of numbers in said summation means, means responsive to a binary number corresponding to a sample of one of said signals in excess of said pick up level to reset a respective counter, whereby when said one of said input signals exceeds said pick up level and remains above said pick up level, said respective counter is reset periodically within a count less than said predetermined count, and when said one of said input signal drops below said pick up level for a period of time, corresponding to said predetermined count, an output is obtained which resets said respective number of said third sequence in said summation means, means for providing a plurality of binary numbers each representing respective one of a plurality of limit numbers, comparator means for continuously comparing each subsequence of binary numbers of said third sequence in said summation means with a respective one of said limit numbers and for providing an output signal when a binary number of said subsequence exceeds a respective limit number.

2. The apparatus of claim 1 in which said summation means includes a serial shift register capable of simultaneous storing a set of numbers of said third sequence, an adder, means for continuously circulating the output of said shift register to an input of said adder least significant bit first, means for circulating each of said numbers of said second sequence least significant bit first to another input of said adder, means for applying the output of said adder to the input of said shift register, means for synchronizing the circulation of the numbers of said second sequence to said one input of said adder with the circulation of the numbers of said third sequence to said other input of said adder so that each of the numbers of one subsequence of said second sequence are added in sequence to a respective number of a correspondence subsequence of said third sequence.

3. The system of claim 1 in which each of said subsequences of said second sequence of numbers is an empirical function $G(I_i)$ of a respective subsequence of said first sequence of samples such that $$\sum_{i=1}^{N} G(I_i) = 1 \text{ constant,}$$

for all pairs of values of time of occurrence of a respective output signal and mean value of a respective input signal, where N equals the number of samples of said respective input signal from the time at which said respective input signal exceeds said pick up level to the time of occurrence of said respective output signal.

4. The system of claim 1 in which said third frequency for clocking said counter means is equal to said second frequency whereby said predetermined count is in excess of the number of samples in one-half cycle of said input signals.

5. The system of claim 4 in which said predetermined count is greater than the number of samples in a cycle of said input signals.

6. The system of claim 1 in which said mean value of said input signal is the root mean square value of said signal.

7. The system of claim 1 in which said plurality of simultaneously occurring alternating input signals are three-phase signals.

8. The system of claim 1 in which said plurality of simultaneously occurring alternating input signals are two-phase signals and a ground signal.

9. The system of claim 1 in which said plurality of limit numbers are identical.

* * * * *